(12) United States Patent
Wilson et al.

(10) Patent No.: US 7,154,995 B1
(45) Date of Patent: Dec. 26, 2006

(54) TECHNIQUE FOR ROUTING AND CONTROLLING EMERGENCY CALLS

(75) Inventors: Richard Bailey Wilson, Plano, TX (US); Alfred M. Saleh, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/978,385

(22) Filed: Nov. 2, 2004

(51) Int. Cl.
H04M 11/00 (2006.01)

(52) U.S. Cl. .......................................... 379/45; 379/37

(58) Field of Classification Search ................. 379/45, 379/37–40, 352; 370/352
See application file for complete search history.

(56) References Cited

U.S. PATENT DOCUMENTS

| | | | |
|---|---|---|---|
| 5,161,180 A * | 11/1992 | Chavous | 379/45 |
| 6,266,397 B1 * | 7/2001 | Stoner | 379/45 |
| 6,757,359 B1 * | 6/2004 | Stumer et al. | 379/45 |
| 2004/0179673 A1 * | 9/2004 | Kim | 379/352 |

OTHER PUBLICATIONS

TELETRONICS, "Out-of-the-box E911 Solutions for Nortel Networks using ISDN-PRI, T1 or CO lines," 2004.
XTEND—Enterprise Alert—"Emergency Notification System".

* cited by examiner

*Primary Examiner*—Stella Woo
(74) *Attorney, Agent, or Firm*—Hunton & Williams LLP (57) ABSTRACT

A technique for routing and controlling emergency calls is disclosed. In one particular exemplary embodiment, the technique may be realized as a method for routing and controlling emergency calls. The method may comprise intercepting an emergency call from a caller. The method may also comprise causing the caller to experience a predetermined delay. The method may additionally comprise communicating a message to the caller during the predetermined delay.

24 Claims, 5 Drawing Sheets

| Incoming Channel | Outgoing Channel |
|---|---|
| 1 | 2 |
| 3 | 4 |
| 5 | 6 |
| 7 | 8 |
| 9 | 10 |
| 11 | 12 |
| 13 | 14 |
| 15 | 16 |
| 17 | 18 |
| 19 | 20 |
| 21 | 22 |
| *23* | *24* |

Figure 5

TECHNIQUE FOR ROUTING AND CONTROLLING EMERGENCY CALLS

FIELD OF THE DISCLOSURE

The present disclosure relates generally to telecommunications and, more particularly, to a technique for routing and controlling emergency calls.

BACKGROUND OF THE DISCLOSURE

It is well known that the telephone number 9-1-1 is reserved for emergency calls only. From anywhere in the public telephone system, people can dial this number to seek assistance from police, fire departments, or medical personnel. A 9-1-1 emergency call is typically routed through the public switched telephone network (PSTN) to a nearby public safety answering point (PSAP). The PSAP then processes the call and dispatches emergency service if necessary.

It is not uncommon for a caller to misdial the 9-1-1 emergency number, especially when the caller is calling from a private network. Since a long distance call originating from a private network typically requires an initial dialing of a "9" followed by a "1," if the caller dials another "1" by mistake, a 9-1-1 emergency call will be initiated. If the caller hangs up before the PSAP can determine the call was a misdial, emergency response personnel may be dispatched to the calling location. Such unnecessary dispatches not only lead to increased expenses for emergency services but also interfere with the responses to true emergencies.

In view of the foregoing, it would be desirable to provide a technique for routing and controlling emergency calls which overcomes the above-described inadequacies and shortcomings.

SUMMARY OF THE DISCLOSURE

A technique for routing and controlling emergency calls is disclosed. In one particular exemplary embodiment, the technique may be realized as a method for routing and controlling emergency calls. The method may comprise intercepting an emergency call from a caller. The method may also comprise causing the caller to experience a predetermined delay. The method may additionally comprise communicating a message to the caller during the predetermined delay.

In accordance with other aspects of this particular exemplary embodiment, the method may further comprise extracting a setup message from the emergency call, wherein the setup message comprises at least a calling line identification (CLID) and a dialed number; verifying the calling line identification (CLID) and the dialed number based on a query to one or more databases; modifying the setup message based on the query; and routing the emergency call based on the setup message.

In accordance with further aspects of this particular exemplary embodiment, the method may further comprise recording the emergency call. And the method may comprise time-stamping the recorded emergency call.

In accordance with additional aspects of this particular exemplary embodiment, the emergency call may originate from within a private network. And the method may further comprise providing notification to on-site personnel associated with the private network.

In accordance with a further aspect of this particular exemplary embodiment, the one or more databases may be selected from a group consisting of a routing database and a CLID database In accordance with a still further aspect of this particular exemplary embodiment, the one or more databases may be associated with an automatic location identification database.

In another particular exemplary embodiment, the technique may be realized by at least one signal embodied in at least one carrier wave for transmitting a computer program of instructions configured to be readable by at least one processor for instructing the at least one processor to execute a computer process for performing the method as recited above.

In yet another particular exemplary embodiment, the technique may be realized by at least one processor readable carrier for storing a computer program of instructions configured to be readable by at least one processor for instructing the at least one processor to execute a computer process for performing the method as recited above.

In still another particular exemplary embodiment, the technique may be realized by a system for routing and controlling emergency calls. The system may comprise means for intercepting an emergency call from a caller, means for causing the caller to experience a predetermined delay, and means for communicating a message to the caller during the predetermined delay.

In accordance with other aspects of this particular exemplary embodiment, the system may further comprise means for extracting a setup message from the emergency call, wherein the setup message comprises at least a calling line identification (CLID) and a dialed number, means for verifying the calling line identification (CLID) and the dialed number based on a query to one or more databases, means for modifying the setup message based on the query, and means for routing the emergency call based on the setup message.

In accordance with further aspects of this particular exemplary embodiment, the system may further comprise means for recording the emergency call. And the system may comprise means for time-stamping the recorded emergency call In accordance with additional aspects of this particular exemplary embodiment, the emergency call may originate from within a private network. And the system may comprise at least one annunciator for providing notification to on-site personnel associated with the private network.

In accordance with a further aspect of this particular exemplary embodiment, the one or more databases may be selected from a group consisting of a routing database and a CLID database.

In accordance with a still further aspect of this particular exemplary embodiment, the system may comprise an automatic location identification database.

In accordance with a yet further aspect of this particular exemplary embodiment, the system may comprise a location identification server.

In still another particular exemplary embodiment, the technique may be realized by a system for routing and controlling emergency calls. The system may comprise a telephone exchange that intercepts an emergency call from a caller. The system may also comprise an emergency call routing and control device that causes the caller to experience a predetermined delay and communicates a message to the caller during the predetermined delay.

In accordance with other aspects of this particular exemplary embodiment, the emergency call routing and control device may extract a setup message from the emergency call, wherein the setup message comprises at least a calling line identification (CLID) and a dialed number, verify the calling line identification (CLID) and the dialed number based on a query to one or more databases, modify the setup message based on the query, and route the emergency call based on the setup message.

In accordance with further aspects of this particular exemplary embodiment, the emergency call routing and control device may comprise a time slot interchange.

In accordance with additional aspects of this particular exemplary embodiment, the emergency call routing and control device may be coupled to the telephone exchange via a T1 PRI trunk.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENT(S)

Figure 1:
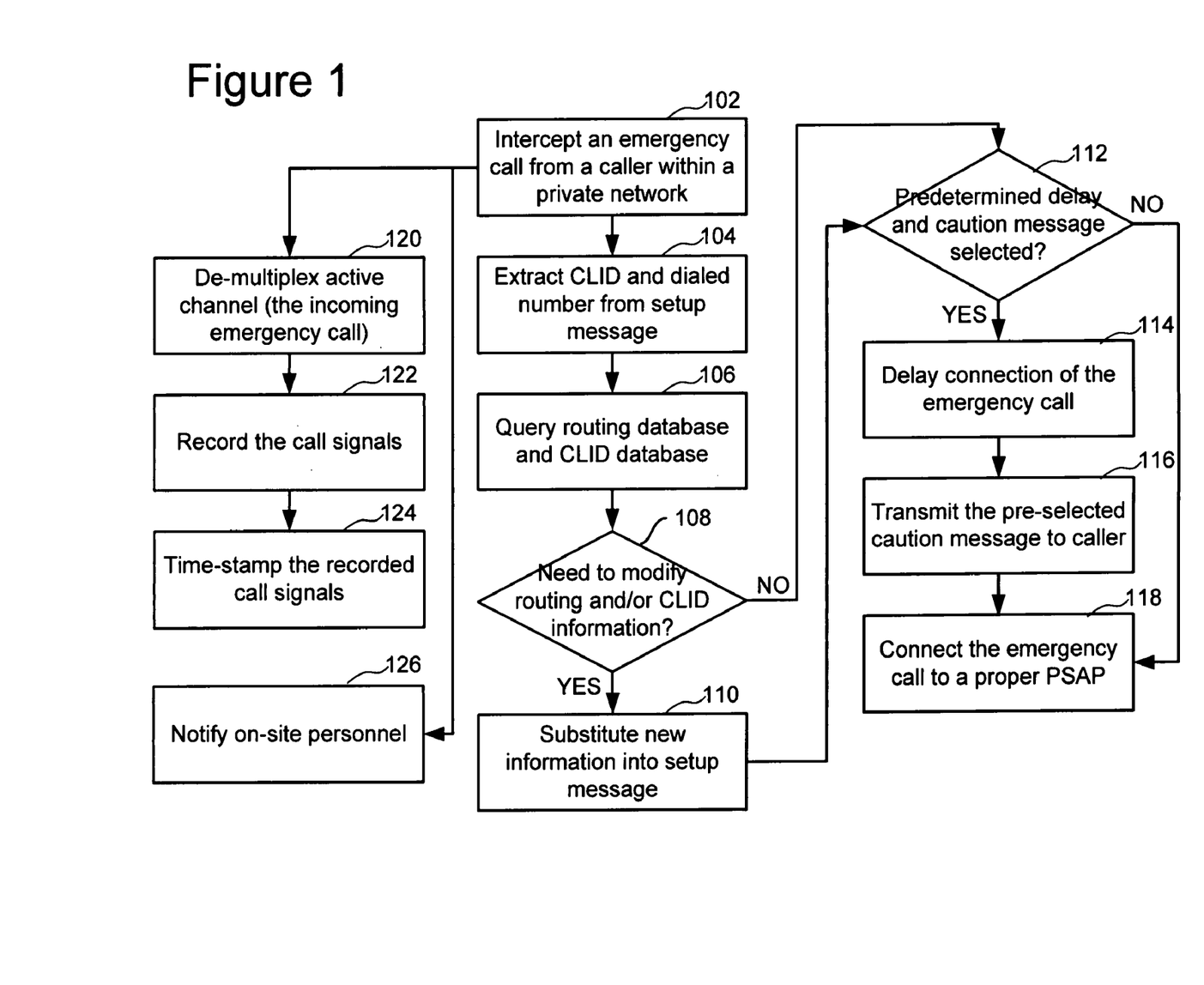
FIG. 1 is a flow chart illustrating an exemplary method for routing and controlling emergency calls in accordance with an embodiment of the present disclosure.

Referring to FIG. 1, there is shown a flow chart illustrating an exemplary method for routing and controlling emergency calls in accordance with an embodiment of the present disclosure.

In step 102, a 9-1-1 emergency call may be intercepted. The emergency call may originate from a caller within a private network. The private network may comprise, for example, a private branch exchange (PBX), an internet protocol private branch exchange (IP PBX), or a network of PBX and IP PBX systems. The emergency call may be placed from a telephone set, an internet protocol (IP) telephone device, a computer, or other telecommunication devices. The private network may be owned by a company or organization where one or more PBX's or IP PBX's interconnect a plurality of extensions or telecommunication devices with a public network (e.g., PSTN). Once the emergency call is dialed, it may be intercepted for local processing. According to one embodiment of the disclosure, the call may be routed through a PBX or IP PBX to a 9-1-1 call routing and control (9-1-1 CRC) device. An exemplary 9-1-1 CRC device will be described below. Alternatively, one or more local processing tasks associated with the emergency call may be implemented by hardware and/or software within or ancillary to the PBX or IP PBX.

An emergency call is usually routed to the PBX as soon as the defining digits (e.g., 9-1-1) are dialed. Therefore, any subsequent digits dialed after "9-1-1" are not captured by the PBX. However, according to embodiments of the present disclosure, it may be desirable to capture all the dialed digits for a more comprehensive processing of the misdialed as well as legitimate emergency calls. For example, it is not uncommon for a caller who intends to dial a long distance number "9-1-202-555-0000" to dial an extra "1," which causes the actual dialed number to be "9-1-1-202-555-0000." It may be desirable to program the PBX and the 9-1-1 CRC device to capture all the digits dialed after "9-1-1," so that it may be determined that the caller most likely intended a long distance call rather than an emergency call.

In step 104, a calling line identification (CLID) and a dialed number may be extracted from the intercepted emergency call. The CLID and the dialed number may be embedded in a call setup message in the emergency call. The call setup message may be received over a data channel (D-channel).

In step 106, a routing database and a CLID database may be queried based on the extracted CLID and dialed number. The routing database may contain automatic route selection (ARS) translation tables for call routing. A typical ARS translation table may provide, for each dialed number, a corresponding routing number. Table 1 is an exemplary ARS translation table which specifies, for each dialed number ("Digits Received"), how many digits are to be deleted and what routing digits ("Actual Digits to Insert") replace the deleted digits. For example, when the digits received are 4-4-4-5-9-1-1, the table specifies that all of the seven digits received should be deleted, and the routing digits 9-9-1-1 should be inserted. The CLID database may contain translation tables for CLID verification and manipulation. A typical CLID translation table may provide, for each CLID received, a replacement CLID that can provide a PSAP with location information of the call. Table 2 is an exemplary CLID translation table which lists received CLIDs or CLID ranges in the left column and corresponding replacement CLIDs in the right column.

TABLE 1

Automatic Route Selection

| Digits Received | Number of Digits to Delete | Actual Digits to Insert |
| --- | --- | --- |
| 911 | 0 | None |
| 4445911 | 7 | 9911 |
| 4425911 | 7 | 6444911 |

TABLE 2

Calling Line Identification Table

| Received CLID or Range | Replacement CLID |
|---|---|
| 4440000–4440999 | 9726841000 |
| 4441000 | 9726841000 |
| 4423971 | 9723623971 |

With the database queries, it may be determined, in step 108, whether the routing and/or CLID information in the call setup message should be modified. Modification of the call routing information (e.g., replacing routing digits) may be necessary in order to eventually route the call to a PSAP. Further, the CLID information embedded in the call as originally dialed may or may not be recognized by a PSAP. Therefore, it may be necessary to replace the original CLID with one recognizable by the PSAP. If it is determined that the information must be modified, then, in step 110, new information (obtained from the databases) may be substituted into the call setup message. Otherwise, the routing and CLID information is verified and the method may branch to step 112 directly.

In step 112, it may be determined whether a delay and/or caution message have been selected. According to embodiments of the disclosure, a predetermined delay (e.g., zero second, 5 seconds, or 10 seconds) may be pre-programmed for some or all emergency calls routed through a PBX. With zero-second delay, an emergency call may be immediately passed through. With a short delay, however, a caller who has misdialed the 9-1-1 number may be afforded a chance to hang up. Preferably, the length of the delay should be long enough for a misdialing caller to abandon the call, yet short enough not to concern an actual emergency caller. Further, a pre-recorded caution message may be announced to the caller to warn of an imminent connection of the emergency call, thereby giving the caller an opportunity to correct a misdial. For example, the message may notify the caller that he or she has dialed an emergency number and should either stay on the line or hang up immediately. The delay and message configuration may be based on practical considerations as well as legal requirements in the relevant jurisdiction. For example, there may be a large number of 9-1-1 misdials originating from the particular private network. In that case, it may be desirable to subject all 9-1-1 calls to a predetermined delay and to alert the callers. The length of the delay and the caution message may be selected upon installation or configuration of the 9-1-1 CRC device and related firmware or software, for example.

If a delay and a caution message have been selected, the emergency call will be delayed, in step 114, for a predetermined period of time (e.g., 5 seconds or 10 seconds). During the delay, in step 116, the pre-selected caution message may be transmitted to the caller. Then, the method may branch to step 118. Alternatively, if a delay or a caution message have not been selected, the method may branch immediately to step 118.

In step 118, the emergency call may be connected to a proper PSAP. Based on the verified or modified routing and CLID information, the emergency call may be routed via the local PBX or IP PBX to the public network and a connection may be established with a proper PSAP.

Additional functions related to the emergency call may be provided in parallel with the above method steps. According to one embodiment, after interception of the emergency call, the active channel on which the call is received may be de-multiplexed in step 120. In step 122, de-multiplexed call signals may be stored on a digital medium, or de-multiplexed call signals may be converted to an analog format for recording. In step 124, the recorded call signals may be optionally time-stamped to facilitate positive tracking of recorded emergency calls. According to embodiments of the disclosure, the recording may start as soon as the call is intercepted in order to catch whatever may be heard at the caller's location, such as background noises, special tones, and announcements. The recording may be helpful for security personnel to evaluate the emergency situation and to determine a proper response.

According to an embodiment of the disclosure, a notification function may also be provided in parallel with the above-described method steps. That is, in step 126, a notification may be provided to on-site personnel associated with the private network. For example, an annunciator device may be activated to notify security personnel.

Figure 2:
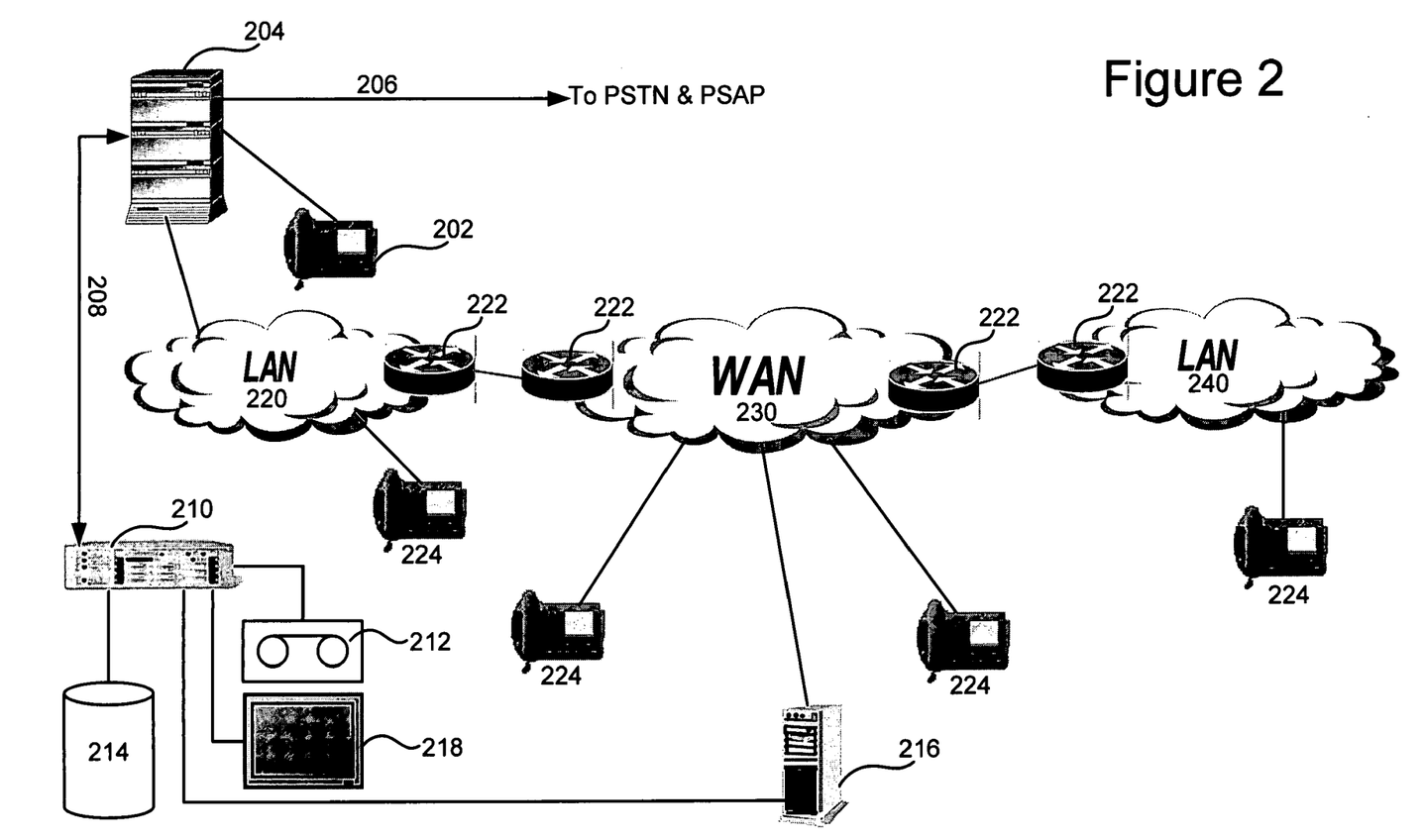
FIG. 2 is a block diagram illustrating an exemplary system for routing and controlling emergency calls in accordance with an embodiment of the present disclosure.

FIG. 2 is a block diagram illustrating an exemplary system for routing and controlling emergency calls in accordance with an embodiment of the present disclosure. In FIG. 2, there are shown a local area network (LAN) 220, a wide area network (WAN) 230, and a LAN 240. These networks are connected to one another via routers 222, and each may have telephone devices 224 connected therewith. One or more of these networks may belong to a private enterprise. If so, telephone devices in the private enterprise network may be connected, for example, to a PBX 204 that communicates with a PSTN via a primary rate ISDN (PRI) trunk 206. ISDN stands for integrated services digital network. The PBX 204 may also be connected with a 9-1-1 CRC device 210 via a T1 PRI trunk 208, for example, which is configured for two-way dial repeating tie trunk type operation. A tie trunk is typically a dedicated, non-switched circuit that links two telephone systems (e.g., PBX's). Connection from the PBX 204 to the 9-1-1 CRC device 210 may also be via other interfaces such as, for example, E1, Signaling System 7 (SS7), H.323 or Session Initiation Protocol (SIP). The 9-1-1 CRC device 210 may be connected with an outboard recording device 212, an automatic location identification (ALI) database 214, an annuciator device 218, and a location identification server (LIS) 216, the functions of which are described below.

Routing within the private enterprise network may be programmed such that all 9-1-1 calls that originate within the network are routed to the 9-1-1 CRC device 210. Therefore, when a caller dials a 9-1-1 emergency call from a telephone device 202 (or an IP-type telephone device 224), the call is effectively intercepted by the 9-1-1 CRC device 210. Upon interception of the call, the 9-1-1 CRC device 210 may extract and analyze routing and CLID information embedded in a call setup message, as described above. Onboard routing and CLID databases (not shown in FIG. 2) of the 9-1-1 CRC device 210 may be queried in order to verify and/or modify the information in the intercepted emergency call before connecting it to a PSAP. The onboard routing and CLID databases may be managed by either the ALI database 214 or the LIS server 216. The ALI database may contain a correlation of the caller's CLID to the physical location of the calling device 202 (or 224). The LIS server 216 is responsible for determining emergency call treatment based on the physical location of IP phones. Signals associated with the emergency call may be converted for storage on the outboard recording device 212 though onboard storage is also feasible. The 9-1-1 CRC device 210 may forward decoded information associated with the emergency call to the annuciator device 218 so that notification of a potential emergency may be communicated to on-site personnel.

Figure 3:
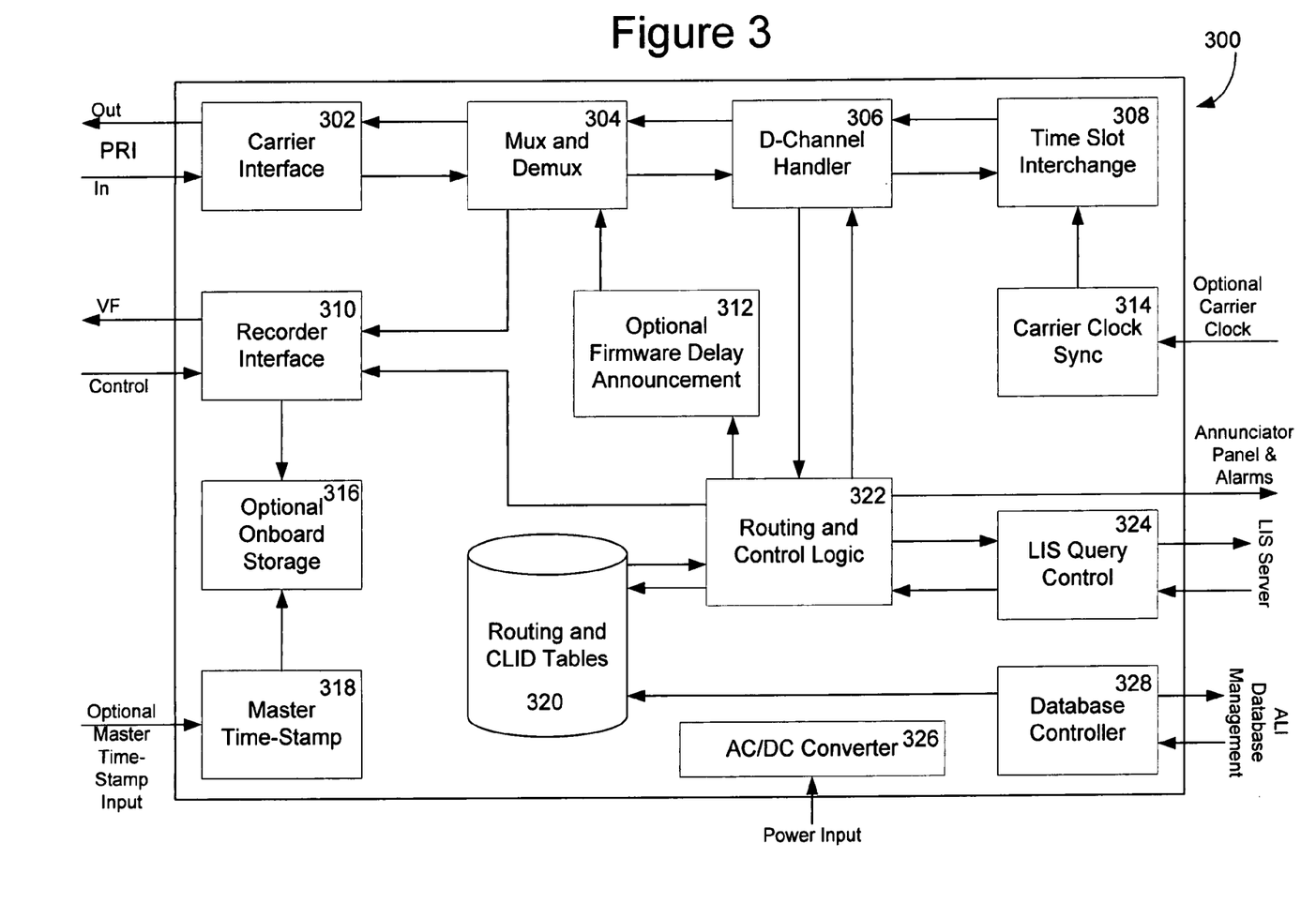
FIG. 3 is a functional diagram illustrating an exemplary device for routing and controlling emergency calls in accordance with an embodiment of the present disclosure.

FIG. 3 is a functional diagram illustrating an exemplary device (300) for routing and controlling emergency calls in accordance with an embodiment of the present disclosure.

This exemplary 9-1-1 CRC device 300 may comprise a routing and control logic module 322. This module may be a micro-processor, micro-controller, and/or some other type of processing device(s) that manage and coordinate the various functional modules in the device 300. An AC or DC converter 326 may take a power input (e.g., commercial 120 VAC or 48 VDC) and convert it to suitable voltage(s) for operation of the device 300.

Figure 4:
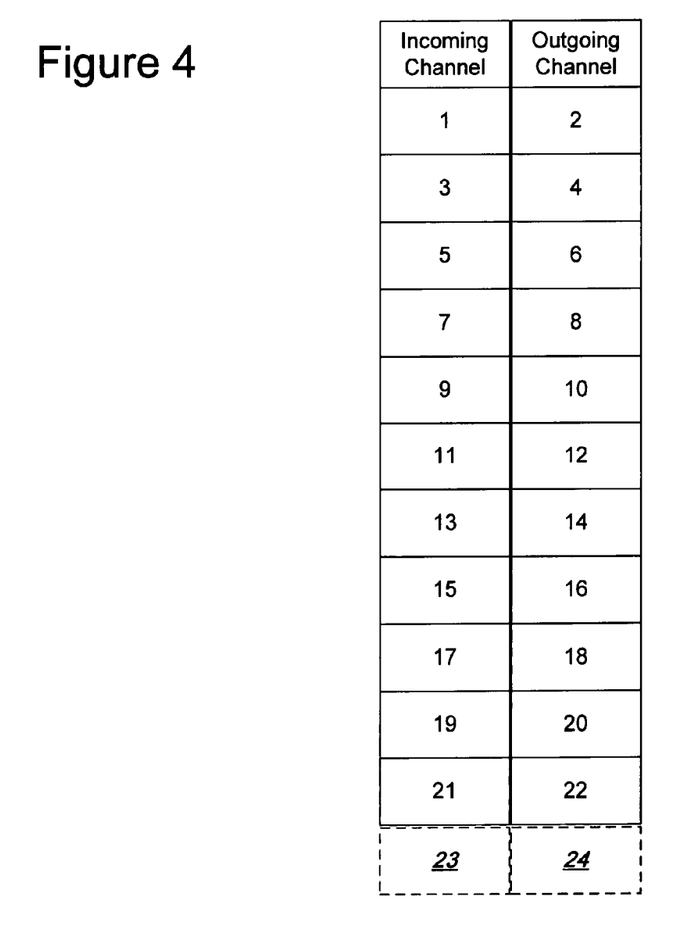
FIG. 4 is a table illustrating incoming and outgoing channels of an exemplary device for routing and controlling emergency calls in accordance with an embodiment of the present disclosure.

The exemplary 9-1-1 CRC device 300 may comprise a carrier interface 302 that couples the device 300 to a carrier facility, such as a T1 PRI trunk as mentioned above. The carrier interface 302 may accommodate a plurality of incoming channels and outgoing channels on the T1 PRI trunk. Intercepted emergency calls are received in the 9-1-1 CRC device 300 via the incoming channels. FIG. 4 is a block diagram illustrating incoming and outgoing channels of an exemplary device for routing and controlling emergency calls in accordance with an embodiment of the present disclosure. In this example, Channels 1–22 are divided into incoming and outgoing channels. Channel 23 is unused and Channel 24 is configured as D-channel for call signaling.

The carrier interface 302 may be coupled with a multiplexer and de-multiplexer module 304. The module 304 may encode and decode information in the incoming and outgoing channels for storage purposes. Storage may be achieved through a recorder interface 310 and emergency call signals can be recorded either in an optional onboard storage device 316 or in an outboard recording device. An optional master time-stamp input may be provided to a master time-stamp module 318 that time-stamps the recordings.

A firmware delay announcement module 312 may provide a delay and/or a caution message to emergency callers. If a delay and a caution message have been selected, the caution message may be multiplexed into the incoming channels and transmitted to the caller. The delay may be effectuated via control of the routing and control logic module 322. The firmware delay announcement module 312 may have multiple settings. For example, in one particular embodiment, the firmware delay announcement module 312 may have three settings. A first setting may offer no delay or message. A second setting may offer a 5-second delay with a short message: "Your emergency call is being transferred to authorities." A third setting may offer a 10-second delay with a long message: "Your emergency call is being transferred to authorities. If you dialed this number in error, please hang up before end of this announcement." Alternatively, the caution message may instruct the caller to stay on the line until the emergency call is answered. It may also be possible to cause the caller to experience a delay without any caution message. The settings may be selected during an initialization of the device 300 via dual inline package (DIP) switches, for example.

A D-channel handler 306 may terminate and control the D-channel of the carrier facility. Controlled by the routing and control logic module 322, the D-channel handler 306 may remove and/or insert supervisory control messages for the setup, termination, and control of emergency calls.

A time slot interchange (TSI) module 308 can shift data from a receive side of an incoming channel to a transmit side of an outgoing channel of adjacent timeslot pairs. Or the TSI module 308 may shift data from a receive side of an outgoing channel to a transmit side of an incoming channel. These shifting operations cause the connection of a telephone call. An optional carrier clock may provide a synchronization clock signal (e.g., 1.544 Mbs) from the PBX to which the 9-1-1 CRC device 300 is connected. The synchronization clock signal may be received in a carrier clock synchronization module 314 and fed to the TSI module 308.

The routing and control logic module 322 may collect, from the D-channel handler 306, routing and CLID information associated with an intercepted emergency call. The module 322 may use this information to query routing and CLID tables 320. The routing and CLID tables 320 may be managed by an outboard ALI database management tool via a database controller 328. The module 322 may also query an outboard LIS server, via a LIS query control module 324, for real-time location information. Based on these queries, the routing and control logic module 322 may then make routing decisions and pass corresponding instructions to the D-channel handler 308. The module 322 may also send output signals to an outboard annunciator device and/or alarms.

Figure 5:
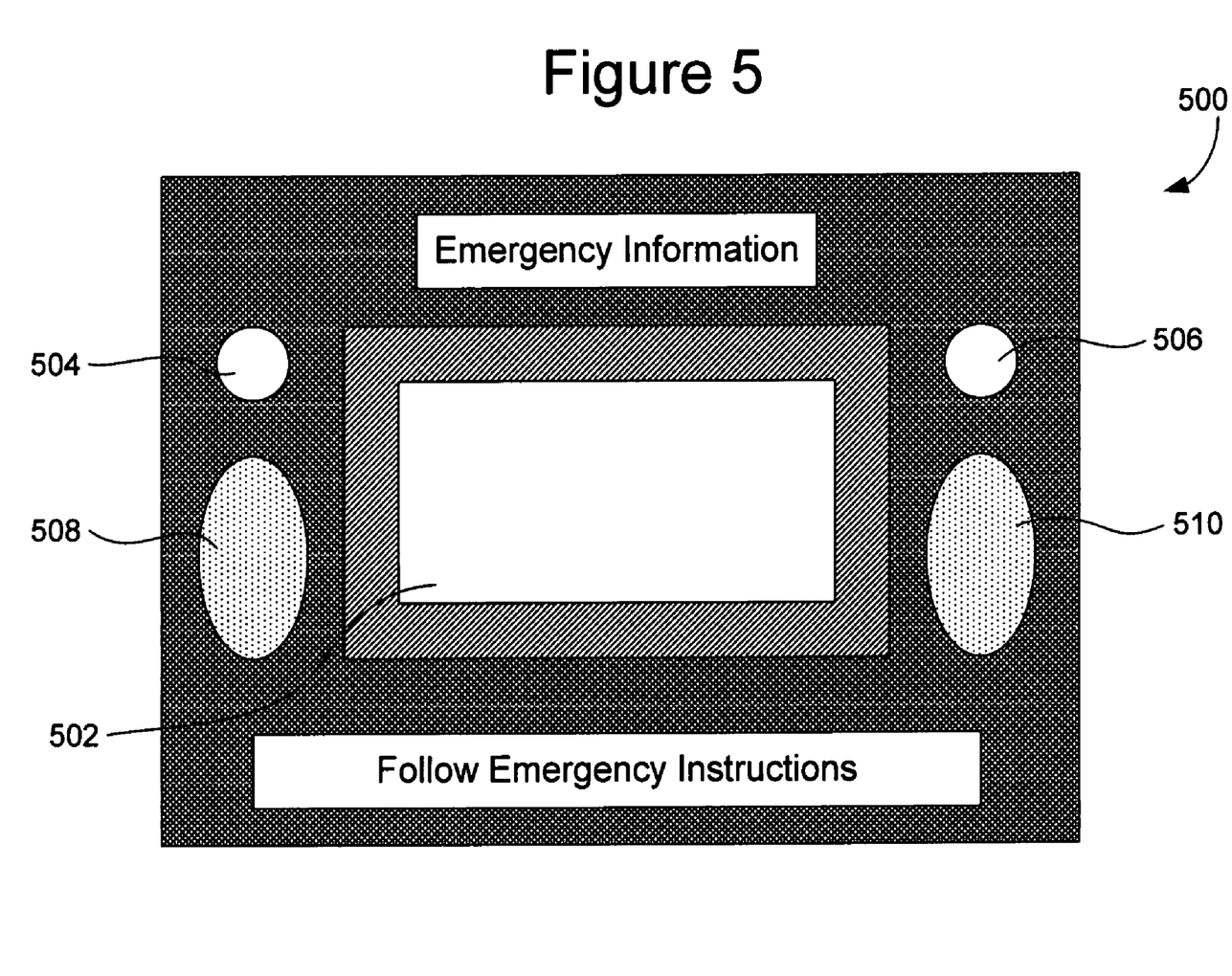
FIG. 5 illustrates an exemplary annunciator device in accordance with an embodiment of the present disclosure.

FIG. 5 illustrates an exemplary annunciator device 500 in accordance with an embodiment of the present disclosure. The annunciator device 500 may comprise a weatherized LCD panel display 502, strobe lights 504 and 506, speakers 508 and 510, and a standard interface (not shown) to the 9-1-1 CRC device described above. The annunciator device 500 may also be equipped with standby power capability. When an emergency call is intercepted by the 9-1-1 CRC device, information decoded from the emergency call may be forwarded to the annunciator device 500 to give notification to on-site security personnel, for example. The strobe lights 504 and 506 may flash and an audible alarm may be produced depending on the level of urgency. The LCD panel 502 may display emergency information such as calling time and caller location. The conversation between the caller and PSAP call taker may be heard on the speakers 508 and 510. Alternatively, the speakers 508 and 510 may announce the location of the emergency in a digitized voice, for example. The on-site security personnel may then coordinate with public emergency services personnel to respond to the call.

At this point it should be noted that emergency call routing and control in accordance with the present disclosure as described above typically involves the processing of input data and the generation of output data to some extent. This input data processing and output data generation may be implemented in hardware or software. For example, specific electronic components may be employed in a computer and/or communications network or similar or related circuitry for implementing the functions associated with emergency call routing and control in accordance with the present disclosure as described above. Alternatively, one or more processors operating in accordance with stored instructions may implement the functions associated with emergency call routing and control in accordance with the present disclosure as described above. If such is the case, it is within the scope of the present disclosure that such instructions may be stored on one or more processor readable carriers (e.g., a magnetic disk), or transmitted to one or more processors via one or more signals.

In summary, embodiments of the present disclosure provide a technique for routing and controlling emergency calls that originate from a private network. Before emergency calls are routed through a PSTN to a proper PSAP, they may be manipulated locally to ensure that they bear proper calling line identification (CLID) and/or automatic number identification (ANI) information. Also, to ensure the legitimacy of emergency calls, control may be added to offer flexible delay and call routing notification to a caller. Additional functions such as remote notification, call monitoring and call recording may also be provided.

It should be noted that, although the description above uses 9-1-1 emergency number as an example, embodiments of the present disclosure may be adapted to accommodate other emergency numbers in the United States as well as in foreign countries. For example, the above-described technique may be applicable to 9-9-9 or 1-1-2 emergency numbers as used in certain countries or regions. Further, although emergency calls that originate from within a private network are described above in the exemplary embodiments, the present disclosure is not limited to private networks.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure can be beneficially implemented in any number of environments for any number of purposes. Accordingly, the claims set forth below should be construed in view of the full breadth and spirit of the present disclosure as described herein.

The invention claimed is:

1. A method for routing and controlling emergency calls, the method comprising:
   intercepting, at a telephone exchange, an emergency call from a caller;
   causing the caller to experience a pre-programmed delay; and
   communicating a message to the caller during the pre-programmed delay.

2. The method according to claim 1, further comprising:
   extracting a setup message from the emergency call, wherein the setup message comprises at least a calling line identification (CLID) and a dialed number;
   verifying the calling line identification (CLID) and the dialed number based on a query to one or more databases;
   modifying the setup message based on the query; and
   routing the emergency call based on the setup message.

3. The method according to claim 1, further comprising: recording the emergency call.

4. The method according to claim 3, further comprising: time-stamping the recorded emergency call.

5. The method according to claim 1, wherein the emergency call originates from within a private network.

6. The method according to claim 5, further comprising: providing notification to on-site personnel associated with the private network.

7. The method according to claim 1, wherein the one or more databases are selected from a group consisting of a routing database and a CLID database.

8. The method according to claim 1, wherein the one or more databases are associated with an automatic location identification database.

9. The method according to claim 1, wherein the one or more databases are associated with a location identification server.

10. At least one signal embodied in at least one carrier wave for transmitting a computer program of instructions configured to be readable by at least one processor for instructing the at least one processor to execute a computer process for performing the method as recited in claim 1.

11. At least one processor readable carrier for storing a computer program of instructions configured to be readable by at least one processor for instructing the at least one processor to execute a computer process for performing the method as recited in claim 1.

12. A system for routing and controlling emergency calls, the system comprising:
   means for intercepting an emergency call from a caller;
   means for causing the caller to experience a pre-programmed delay; and
   means for communicating a message to the caller during the pre-programmed delay.

13. The system according to claim 12, further comprising:
   means for extracting a setup message from the emergency call, wherein the setup message comprises at least a calling line identification (CLID) and a dialed number;
   means for verifying the calling line identification (CLID) and the dialed number based on a query to one or more databases;
   means for modifying the setup message based on the query; and
   means for routing the emergency call based on the setup message.

14. The system according to claim 12, further comprising: means for recording the emergency call.

15. The system according to claim 14, further comprising: means for time-stamping the recorded emergency call.

16. The system according to claim 12, wherein the emergency call originates from within a private network.

17. The system according to claim 16, further comprising:
   at least one annunciator for providing notification to on-site personnel associated with the private network.

18. The system according to claim 12, wherein the one or more databases are selected from a group consisting of a routing database and a CLID database.

19. The system according to claim 12, further comprising an automatic location identification database.

20. The system according to claim 12, further comprising a location identification server.

21. A system for routing and controlling emergency calls, the system comprising:
   a telephone exchange that intercepts an emergency call from a caller; and
   an emergency call routing and control device that:
      causes the caller to experience a pre-programmed delay; and
      communicates a message to the caller during the pre-programmed delay.

22. The system according to claim 21, wherein the emergency call routing and control device:
   extracts a setup message from the emergency call, wherein the setup message comprises at least a calling line identification (CLID) and a dialed number;
   verifies the calling line identification (CLID) and the dialed number based on a query to one or more databases;
   modifies the setup message based on the query; and
   routes the emergency call based on the setup message.

23. The system according to claim 21, wherein the emergency call routing and control device comprises a time slot interchange.

24. The system according to claim 21, wherein the emergency call routing and control device is coupled to the telephone exchange via a T1 PRI trunk.

* * * * *